US009332387B2

(12) United States Patent
Davis et al.

(10) Patent No.: US 9,332,387 B2
(45) Date of Patent: May 3, 2016

(54) PREFETCHING AND CACHING MAP DATA BASED ON MOBILE NETWORK COVERAGE

(75) Inventors: Benjamin (Max) Davis, San Francisco, CA (US); Daniel Berlin, North Potomac, MD (US); Daniel Bentley, New York, NY (US)

(73) Assignee: GOOGLE INC., Mountain View, CA (US)

( * ) Notice: Subject to any disclaimer, the term of this patent is extended or adjusted under 35 U.S.C. 154(b) by 227 days.

(21) Appl. No.: 13/462,476

(22) Filed: May 2, 2012

(65) Prior Publication Data

US 2015/0156609 A1    Jun. 4, 2015

(51) Int. Cl.
*H04W 24/00* (2009.01)
*H04W 4/02* (2009.01)

(52) U.S. Cl.
CPC ..................................... *H04W 4/021* (2013.01)

(58) Field of Classification Search
CPC ..................................................... H04W 4/021
USPC ..................... 455/414.1, 414.2, 457; 701/208
See application file for complete search history.

(56) References Cited

U.S. PATENT DOCUMENTS

| 4,984,279 | A  | 1/1991  | Kidney et al.  |
|-----------|----|---------|----------------|
| 5,345,086 | A  | 9/1994  | Bertram        |
| 5,793,310 | A  | 8/1998  | Watanabe et al.|
| 6,094,685 | A  | 7/2000  | Greenberg et al.|
| 6,199,150 | B1 | 3/2001  | Yoshikawa      |
| 6,330,453 | B1 | 12/2001 | Suzuki et al.  |
| 6,400,690 | B1 | 6/2002  | Liu et al.     |
| 6,442,757 | B1 | 8/2002  | Hancock et al. |
| 6,453,233 | B1 | 9/2002  | Kato           |
| 6,571,279 | B1 | 5/2003  | Herz et al.    |
| 6,853,911 | B1 | 2/2005  | Sakarya        |
| 7,006,820 | B1 | 2/2006  | Parker et al.  |
| 7,136,748 | B2 | 11/2006 | Umezu et al.   |
| 7,263,368 | B2 | 8/2007  | Knauerhase et al. |
| 7,315,259 | B2 | 1/2008  | Sacks          |

(Continued)

FOREIGN PATENT DOCUMENTS

| KR | 10-2008-071228 | 8/2008 |
| WO | WO-98/28714 A1 | 7/1998 |
| WO | WO-2009/027161 A1 | 3/2009 |

OTHER PUBLICATIONS

Google Developers, "Google Maps API," (2012). Retrieved from the Internet on Aug. 31, 2012: URL:https://developers.google.com/maps/.

(Continued)

*Primary Examiner* — Wayne Cai
(74) *Attorney, Agent, or Firm* — Marshall, Gerstein & Borun LLP (57) ABSTRACT

When a mobile device is positioned in a first coverage area with first service parameters, it is determined that the mobile device is likely to enter a second coverage area with second service parameters. The mobile device has access to map data while in the first coverage area and the second coverage area. If it is determined that the first coverage area is more favorable to data transfer than the second coverage area using the service parameters, a request for map data for rendering a map of the second coverage area is generated when the mobile device is within the first coverage area, and prior to receiving a request to view the map of the second coverage area on the mobile device. The map data is received and stored on the mobile device for subsequent rendering.

20 Claims, 5 Drawing Sheets

(56) References Cited

U.S. PATENT DOCUMENTS

| | | | |
|---|---|---|---|
| 7,327,349 B2 | 2/2008 | Robbins et al. | |
| 7,464,109 B2 | 12/2008 | Modi | |
| 7,502,780 B2 | 3/2009 | Thorpe | |
| 7,502,876 B1 | 3/2009 | Nemirovsky et al. | |
| 7,551,182 B2 | 6/2009 | Bethune et al. | |
| 7,571,422 B2 | 8/2009 | Adel et al. | |
| 7,577,520 B2 | 8/2009 | Nomura | |
| 7,584,434 B2 | 9/2009 | Okamura | |
| 7,610,147 B2 | 10/2009 | Umezu et al. | |
| 7,663,671 B2 | 2/2010 | Gallagher et al. | |
| 7,710,421 B2 | 5/2010 | Muramatsu | |
| 7,711,473 B2 | 5/2010 | Sekine et al. | |
| 7,734,412 B2 | 6/2010 | Shi et al. | |
| 7,739,037 B2 | 6/2010 | Sumizawa et al. | |
| 7,796,837 B2 | 9/2010 | Lueck | |
| 7,831,383 B2 | 11/2010 | Oohashi | |
| 7,831,387 B2 | 11/2010 | Golding et al. | |
| 7,839,421 B2 | 11/2010 | Bethune et al. | |
| 7,873,465 B2 | 1/2011 | Geelen et al. | |
| 7,920,968 B2 | 4/2011 | Chapin et al. | |
| 7,925,624 B2 | 4/2011 | Vosshall et al. | |
| 7,925,982 B2 | 4/2011 | Parker et al. | |
| 7,962,565 B2 | 6/2011 | Coker | |
| 7,974,959 B2 | 7/2011 | Sawai et al. | |
| 7,975,025 B1 | 7/2011 | Szabo et al. | |
| 7,983,659 B2 | 7/2011 | Shinya | |
| 7,996,445 B2 | 8/2011 | Fair et al. | |
| 8,005,612 B2 | 8/2011 | Asahara et al. | |
| 8,010,407 B1 | 8/2011 | Santoro et al. | |
| 8,014,796 B2 | 9/2011 | Boudreau et al. | |
| 8,032,297 B2 | 10/2011 | Jakobson | |
| 8,060,389 B2 | 11/2011 | Johnson | |
| 8,078,641 B2 | 12/2011 | Mao et al. | |
| 8,095,307 B2 | 1/2012 | Ebert et al. | |
| 8,204,966 B1 | 6/2012 | Mendis et al. | |
| 8,280,414 B1 | 10/2012 | Nourse et al. | |
| 2002/0133491 A1 | 9/2002 | Sim et al. | |
| 2003/0187984 A1 | 10/2003 | Banavar et al. | |
| 2004/0117109 A1* | 6/2004 | Kodani et al. | 701/200 |
| 2004/0203998 A1 | 10/2004 | Knauerhase et al. | |
| 2004/0220730 A1 | 11/2004 | Chen et al. | |
| 2006/0026170 A1 | 2/2006 | Kreitler et al. | |
| 2006/0067224 A1 | 3/2006 | Ohara | |
| 2006/0069749 A1 | 3/2006 | Herz et al. | |
| 2006/0080032 A1 | 4/2006 | Cooper et al. | |
| 2006/0195256 A1 | 8/2006 | Nakamura et al. | |
| 2006/0277271 A1 | 12/2006 | Morse et al. | |
| 2007/0050128 A1 | 3/2007 | Lee et al. | |
| 2007/0080830 A1 | 4/2007 | Sacks | |
| 2007/0143014 A1 | 6/2007 | Sekine et al. | |
| 2007/0242077 A1 | 10/2007 | Danan | |
| 2007/0273558 A1 | 11/2007 | Smith et al. | |
| 2007/0282915 A1 | 12/2007 | Vosshall et al. | |
| 2008/0071988 A1 | 3/2008 | Schloter et al. | |
| 2008/0082225 A1 | 4/2008 | Barrett | |
| 2008/0102857 A1 | 5/2008 | Kim | |
| 2008/0132214 A1* | 6/2008 | Dupray et al. | 455/415 |
| 2008/0132249 A1 | 6/2008 | Hamilton | |
| 2008/0177469 A1 | 7/2008 | Geelen et al. | |
| 2008/0238723 A1 | 10/2008 | Fein et al. | |
| 2008/0270579 A1 | 10/2008 | Herz et al. | |
| 2008/0291205 A1 | 11/2008 | Rasmussen et al. | |
| 2009/0063042 A1 | 3/2009 | Santesson et al. | |
| 2009/0125228 A1 | 5/2009 | Dicke et al. | |
| 2009/0128483 A1 | 5/2009 | Robbins et al. | |
| 2009/0132163 A1 | 5/2009 | Ashley, Jr. et al. | |
| 2009/0153563 A1 | 6/2009 | Tudose | |
| 2009/0182500 A1 | 7/2009 | Dicke | |
| 2009/0198767 A1 | 8/2009 | Jakobson et al. | |
| 2009/0244095 A1 | 10/2009 | Bowman et al. | |
| 2009/0281718 A1 | 11/2009 | Gibran et al. | |
| 2009/0287750 A1 | 11/2009 | Banavar et al. | |
| 2009/0319177 A1 | 12/2009 | Khosravy et al. | |
| 2009/0319188 A1 | 12/2009 | Otto | |
| 2009/0326810 A1 | 12/2009 | Callaghan et al. | |
| 2010/0020091 A1 | 1/2010 | Rasmussen et al. | |
| 2010/0106397 A1 | 4/2010 | Van Essen | |
| 2010/0106801 A1 | 4/2010 | Bliss et al. | |
| 2010/0117810 A1 | 5/2010 | Hagiwara et al. | |
| 2010/0131186 A1 | 5/2010 | Geelen et al. | |
| 2010/0153007 A1 | 6/2010 | Crowley | |
| 2010/0179940 A1 | 7/2010 | Gilder et al. | |
| 2010/0250646 A1 | 9/2010 | Dunagan et al. | |
| 2010/0274899 A1 | 10/2010 | Shrivastava et al. | |
| 2010/0280753 A1* | 11/2010 | Chytil et al. | 701/208 |
| 2010/0321399 A1 | 12/2010 | Ellren et al. | |
| 2010/0333085 A1 | 12/2010 | Criddle et al. | |
| 2011/0054776 A1 | 3/2011 | Petrov et al. | |
| 2011/0093515 A1 | 4/2011 | Albanese | |
| 2011/0095993 A1 | 4/2011 | Zuverink | |
| 2011/0098917 A1 | 4/2011 | LeBeau et al. | |
| 2011/0098918 A1 | 4/2011 | Siliski et al. | |
| 2011/0161875 A1 | 6/2011 | Kankainen | |
| 2011/0213798 A1 | 9/2011 | Osuka et al. | |
| 2011/0217964 A1* | 9/2011 | Matsuo et al. | 455/414.2 |
| 2011/0276263 A1 | 11/2011 | Shimotani et al. | |
| 2011/0300848 A1 | 12/2011 | Boudreau et al. | |
| 2011/0307171 A1* | 12/2011 | Waite | 701/208 |
| 2011/0316854 A1 | 12/2011 | Vandrovec | |
| 2012/0022786 A1 | 1/2012 | Siliski et al. | |
| 2012/0022787 A1 | 1/2012 | LeBeau et al. | |
| 2012/0083995 A1 | 4/2012 | Vorona | |

OTHER PUBLICATIONS

International Search Report and Written Opinion for Application No. PCT/US2012/051574, dated Feb. 15, 2013.
International Search Report and Written Opinion for Application No. PCT/US2012/051577, dated Feb. 15, 2013.
International Search Report and Written Opinion for Application No. PCT/US2012/065002, dated Mar. 29, 2013.
International Search Report and Written Opinion for Application No. PCT/US2012/065008, dated Mar. 29, 2013.
International Search Report for Application No. PCT/US2012/051564, dated Feb. 18, 2013.
Kirchner et al. "A Location-aware Prefetchting Mechanism," Project work at Distributed Information Systems Laboratory LSIR (2004).
Mapquest, "JavaScript Maps API," (2012). Retrieved from the Internet on Aug. 31, 2012: URL:http://developer.mapquest.com/web/products/featured/javascript.
Molina, "Aiming and Guiding Navigation with a Non-visual GPS Application," Department of Design Sciences Faculty of Engineering, Lund University (2010).
MSDN, "Get Started Using Bing Maps," (2012). Retrieved from the Internet on Aug. 31, 2012: URL:http://msdn.microsoft.com/en-us/library/dd877180.aspx.
Office action for U.S. Appl. No. 13/244,717 dated Nov. 15, 2011.
Office action for U.S. Appl. No. 13/244,764 dated Nov. 28, 2011.
Piras et al., "Compact GML: merging mobile computing and mobile cartography," CRS4, Center for Advanced Studies, Research and Development in Sardinia (2004).
Reichenbacher et al., "The World in Your Pocket—Towards a Mobile Cartography," Proc. of the 20th International Cartographic Conference (2001).
Weber, "Mobile Map Browsers: Anticipated User Interaction for Data Pre-Fetching," Thesis, The University of Maine, (2010).
Wiki, "API," (2012). Retrieved from the Internet on Aug. 31, 2012: URL:http://wiki.openstreetmap.org/wiki/API.

* cited by examiner

PREFETCHING AND CACHING MAP DATA BASED ON MOBILE NETWORK COVERAGE

FIELD OF DISCLOSURE

This disclosure relates to prefetching and caching map data based on mobile network coverage.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many mobile devices include global positioning system (GPS) receivers or other positioning technologies that allow the devices to determine the geographic coordinates of the mobile devices. These positioning technologies enable the mobile devices to serve as navigation devices, in some cases providing turn-by-turn driving directions to a mobile device user. Most navigation devices present a georeferenced map to the mobile device user to allow the mobile device user to see on the map the current location of the mobile device. In many devices, the map data is stored on a memory in the mobile device. In some cases, the map data may occupy hundreds of megabytes or over a gigabyte of storage.

Recently, many mobile devices operating as navigation devices have been configured to download map data as needed, thereby reducing the amount of storage space needed for map data. However, mobile devices so configured require data connections to download the map data. To reduce the amount of data downloaded, the mobile devices are typically configured to download map data for areas local to the mobile device. As the mobile device moves, the mobile device may be configured to access a data network and download new map data corresponding to the area local to the new location of the mobile device.

However, mobile devices sometimes may encounter geographic areas of limited or no mobile data network access. Further, mobile devices may enter geographic areas in which access to a data network may be slower or faster than in other areas. Still further, mobile devices may enter areas in which access to a data network is more expensive or less expensive than in other areas.

BRIEF SUMMARY

In accordance with an example of the present disclosure, a method is presented for acquiring map data for rendering a map on a mobile device. The method includes automatically determining, at a time when the mobile device is positioned in a first coverage area, that the mobile device is likely to enter a second coverage area, where the first coverage area is associated with first service parameters and the second coverage area is associated with second service parameters, and where the mobile device has access to map data while in the first coverage area and the second coverage area. The method also includes, in response to determining that the mobile device is likely to enter the second coverage area, automatically determining that the first coverage area is more favorable to data transfer than the second coverage area using the first service parameters and the second service parameters. The method also includes, in response to determining that the first coverage area is more favorable to data transfer than the second coverage area, generating a request for map data for rendering a map of the second coverage area, where the request is generated when the mobile device is within the first coverage area, and where the request is generated prior to receiving a request to view the map of the second coverage area on the mobile device. The method further includes receiving, at the mobile device, the map data from a map data server, and storing the map data in the non-transitory computer-readable medium. Still further, the method includes, in response to receiving the request to view the map of the second coverage area, rendering the map using the stored map data.

In accordance with another example of the present disclosure, a mobile device is presented. The mobile device includes a processor, a display in communication with the processor, a radio communications transceiver in communication with the processor, and a non-transitory computer-readable medium in communication with the processor, where the computer-readable medium stores instructions that are executable by the processor. The instructions are executable to cause the processor to automatically determine, at a time when the mobile device is positioned in a first coverage area, that the mobile device is likely to enter a second coverage area, where the first coverage area is associated with first service parameters and the second coverage area is associated with second service parameters, and where the mobile device has access to map data while in the first coverage area and the second coverage area. The instructions are also operable to cause the processor, in response to determining that the mobile device is likely to enter the second coverage area, to automatically determine that the first coverage area is more favorable to data transfer than the second coverage area using the first service parameters and the second service parameters. The instructions are further operable to cause the processor, in response to determining that the first coverage area is more favorable to data transfer than the second coverage area, to generate a request for map data for rendering a map of the second coverage area, where the request is generated when the mobile device is within the first coverage area, and where the request is generated prior to receiving a request to view the map of the second coverage area on the mobile device. In addition, the instructions are operable to cause the processor to receive, at the mobile device, the map data from a map data server, store the map data in the non-transitory computer-readable medium, and in response to receiving the request to view the map of the second coverage area, render the map using the stored map data.

In accordance with yet another example of the present disclosure, a method for acquiring map data for rendering a map on a mobile device is presented. The method includes receiving a signal indicating that the mobile device is likely to require map data for rendering a map of a target geographic region at the mobile device. The method further includes automatically generating a metric corresponding to transferring the map data to the mobile device while the mobile device is in the target geographic region in response to receiving the signal. The metric reflects one or more of: (i) expected power expenditure related to transferring the map data, (ii) expected financial cost of transferring the map data, or (iii) expected amount of time required to transfer the map data. The method also includes determining, based on the generated metric, whether the mobile device should prefetch the map data, and, if it is determined that the mobile device should prefetch the map data, causing the map data to be transferred from a map data server to the mobile device prior to the mobile device entering the target geographic region for subsequent rendering on the mobile device.

BRIEF DESCRIPTION OF THE DRAWINGS

The present disclosure may be better understood by referring to the accompanying drawings, in which.

DETAILED DESCRIPTION

Generally speaking, a mobile device receives and stores map data for a geographic region before entering the geographic region, and without an explicit request for this map data from a user. Obtaining map data in this manner is referred to below as "prefetching." In the examples below, a prefetching manager operating as a software component in the mobile device or on a network server can prefetch map data in view of network coverage in a target geographic region to which the mobile device is likely to travel, wireless network coverage or wired network access at the current location of the mobile device, or both. To determine whether map data should be prefetched for the target geographic region, the prefetching manager may compare one or several parameters in the target geographic region to the corresponding parameters at the present location. A metric developed using these parameters may reflect, for example, the expected amount of time required to download the map data, the expected power expenditure related to downloading the map data, the financial cost of downloading the map data (e.g., "roaming" charges), etc. These and other relevant parameters are referred to below as "service parameters" or simply "parameters." With a user's consent, the prefetching manager may determine whether map data should be prefetched when the user searches for directions to a location in the target region, for example, or in response to another suitable signal. The present disclosure, therefore, provides examples of systems and methods for prefetching map data for a mobile device while the mobile device is in one or more areas with favorable network access.

Figure 1:
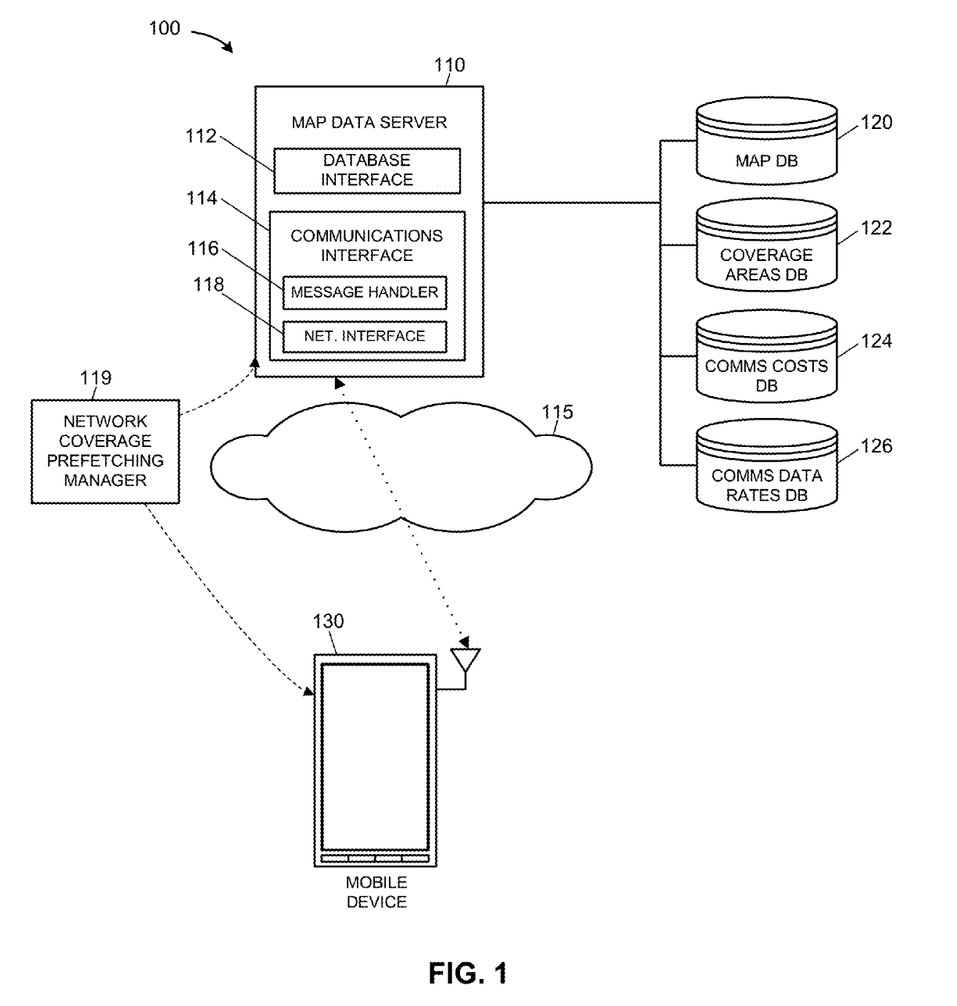
FIG. 1 illustrates an example system in which the techniques of the present disclosure can be implemented.

With reference to FIG. 1, a system 100 according to an example of the present disclosure is presented. The system 100 includes one or more mobile devices 130 in communication with a map data server 110. The mobile device 130 may be a smartphone, a laptop computer, a tablet computer, navigation system built into a vehicle, etc. The map data server 110 may be implemented as a single device or a group of devices using any suitable hardware and software components. The map data server 110 is configured to communicate with one or more mobile devices 130 via a communications interface 114 and a communication network 115, which may be a wide area network such as the Internet, for example. The communications interface 114 may include a message handler interface 116 for sending and receiving communications messages over the network interface 118.

A network coverage prefetching manager 119 (for simplicity, "the prefetching manager 119") may be implemented as a software component operating in the map data server 110 or a mobile device 130. Further, in some implementations, the prefetching manager 119 includes a component implemented in the mobile device 130 as well as a component implemented in the map data server 110. The prefetching manager 119 can be implemented, for example, as a set of instructions executable on one or more processors and stored on a hard disk drive (HDD) or any other suitable storage medium. In operation, the prefetching manager 119 receives a triggering event indicating that the mobile device 130 is likely to be in a certain target geographic region at a later time. The prefetching manager 119 then analyzes service parameters in the current and/or target geographic regions and, in some cases, prefetches map data for the target geographic region. Example techniques which the prefetching manager 119 or a similar component can implement are discussed in more detail with reference to FIGS. 3-5.

With continued reference to FIG. 1, the map data server 110 may use a database interface 112 to access one or more of map data from a map database 120, mobile network coverage area data from a coverage area database 122, mobile network communications cost data from a communications costs database 124, and communications data rate information from a communications data rates database 126 for sharing the information with the one or more mobile devices 130. In an example implementation, each of the databases 120-126 is a relational database implemented as a set of electronic data records stored on computer-readable medium in a respective server or group of servers, some of which may be maintained by different operators. For example, a provider of network coverage information may operate the database 122 and provide an API for accessing and retrieving the desired data. As another example, the databases 120-126 may be provided as a single electronic database.

In general, the map database 120 can store map data in one or more formats, including different types of raster-formatted data and vector-formatted data. Raster data, including bitmap data, is generally characterized by one or more arrays of individual data points or data tuples. Vector data, on the other hand, is generally characterized by geometric objects such as points, lines, polylines, and polygons. Raster data tends to require more storage space and, therefore, more bandwidth compared to vector data. However, raster data may be better suited for aerial imagery. Vector data, on the other hand, may be better suited for road data and other data formatted as lines and other geometric shapes.

The data cached by mobile devices 130 according to examples of the present disclosure may also include, for example, graphical map tiles, road and address information, business information, or any other data needed to support mapping or determining directions (e.g., road speeds, one-way roads, etc.). More specifically, in addition to map data, the prefetching manager 119 can request business data or other additional information for the relevant geographic region. In some cases, the prefetching manager 119 may request map data and non-map data from different providers.

The network coverage area database 122 may store indications of areas in which network access is known to be available, limited, unavailable, etc. For example, if a data network lacks coverage or has poor access characteristics in specific rural areas, the coverage areas database 122 might include this information. Alternatively, the coverage areas database 122 might store boundaries of areas known to have network access. In some examples, the coverage areas database 122 may be provided by or be specific to a service provider of the mobile device 130. In other examples, the coverage areas database 122 might be provided by a third party and might include data related to several mobile network service providers.

A database provider may aggregate data communications costs information for several geographic regions into a communications costs database 124. For example, a mobile device network may have one or more data access costs associated with accessing the network. Subscribers to a mobile device network may be sold unlimited access to the mobile device network for a fixed monthly rate. In other situations, subscribers to the mobile device network may be sold access to transfer a capped amount of data for a fixed monthly rate. In this situation, subscribes who exceed the data cap may be charged a higher rate on a per-data unit basis. In other situations, users who have not subscribed to the mobile device network may be granted access to the mobile device network. Furthermore, when mobile devices 130 roam onto the mobile device network to which they have not subscribed, the users of the mobile devices 130 may be charged roaming fee rates that are substantially higher than the rates paid by subscribers of the mobile device network.

The same or a different database provider also may aggregate into a communications data rates database 126 maximum communications data rate information for several geographic regions. The communications data rates database 126 may include one or more indications of the communications technology used in a data network. For example, the communications technology may support one or more of Enhanced Data rates for GSM Evolution (EDGE), High Speed Packet Access (HSPA), Worldwide Interoperability for Microwave Access (WiMax), $3^{rd}$ Generation Partnership Project Long Term Evolution (LTE) as well as improvement to these technologies, technologies generally referred to as 3G and 4G technologies, local area network communications technologies (e.g., 802.11x, Bluetooth®), and any other wireless communications technologies.

The communications data rates database 126 also might include statistics related to actual communications data throughput rates. Even though a communications network might support a high data rate, other factors might limit that actual data rates achieved by devices using the communications network. For example, while an LTE network might be capable of theoretical data rates of tens of megabits per second, devices on the network might experience much lower data rates due to network overload and congestion. The communications data rates database 126 might include historical network throughput data rates that can be used by the mobile device 130 or map data server 110 in deciding when to cause the mobile device 130 to cache map data.

Figure 2:
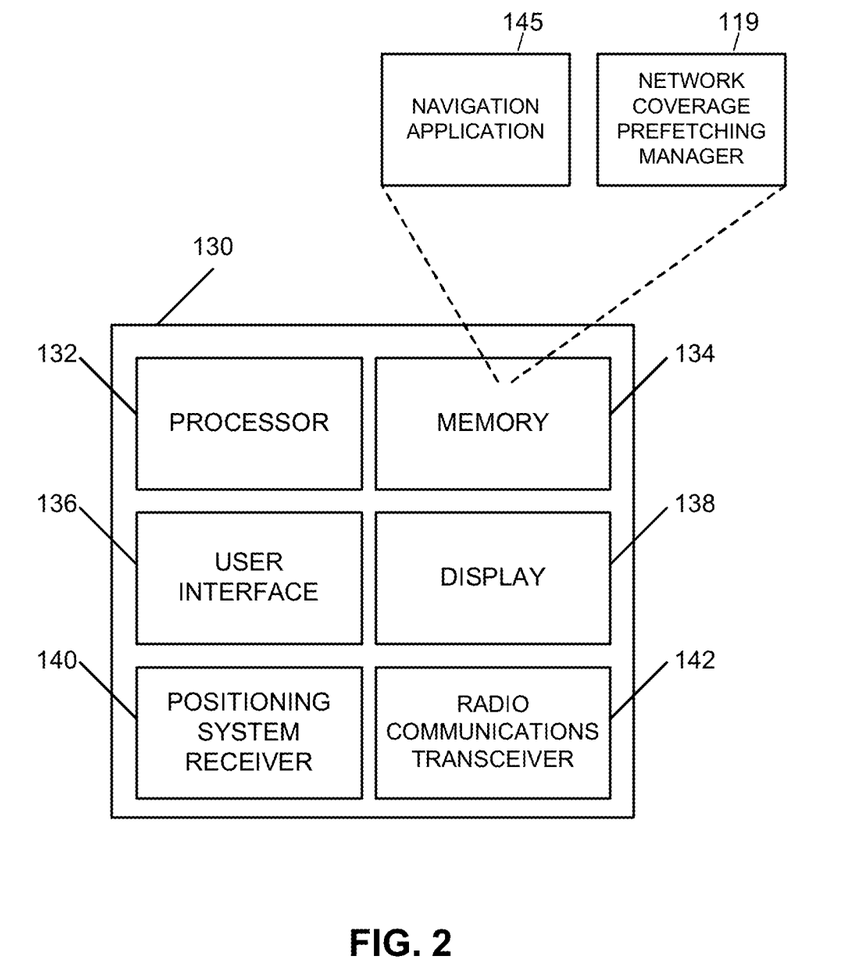
FIG. 2 illustrates a number of modules that may be used in a mobile device that operates in the system of FIG. 1.

Now referring to FIG. 2, the mobile device 130 of FIG. 1 may include a number of modules 132-142. In an example, the mobile device 130 includes one or several processors 132 in communication with a computer-readable memory 134. For simplicity, the computer-readable memory 134 is illustrated in FIG. 2 as a single component. However, it will be understood that the mobile device 130 may include both persistent memory such as a hard disk and volatile memory such as random-access memory (RAM). The mobile device 130 also includes a user interface module 136 to receive input from a user and a display 138 to display output. More generally, the mobile device 130 may be equipped with any suitable input, output, and input/output (e.g., a touchscreen) components. Further, the mobile device 130 includes a positioning system receiver 140 such as a Global Positioning Service (GPS) chip and a radio communications transceiver 142 to communicate on a cellular network, a wireless local area network, and/or any other suitable network.

A user of the mobile device 130 can download or otherwise obtain software applications to enable the mobile device 130 to perform additional functions, such as providing turn-by-turn navigation directions. For example, a navigation application 145 may be stored in the memory 134 and execute on the processor 132 to request and receive map data via the radio communications transceiver 142, process the map data to render map images on the display 138, variously adjust the map images in response to user commands provided via the user interface 136, etc. Additionally or alternatively, the mobile device 130 may execute any other software application that utilizes map data, such as a social networking application or a shopping application. The prefetching manager 119 may be provided as a component of the map viewing application 145 or as a separate software component (such as a plug-in), depending on implementation.

Figure 3:
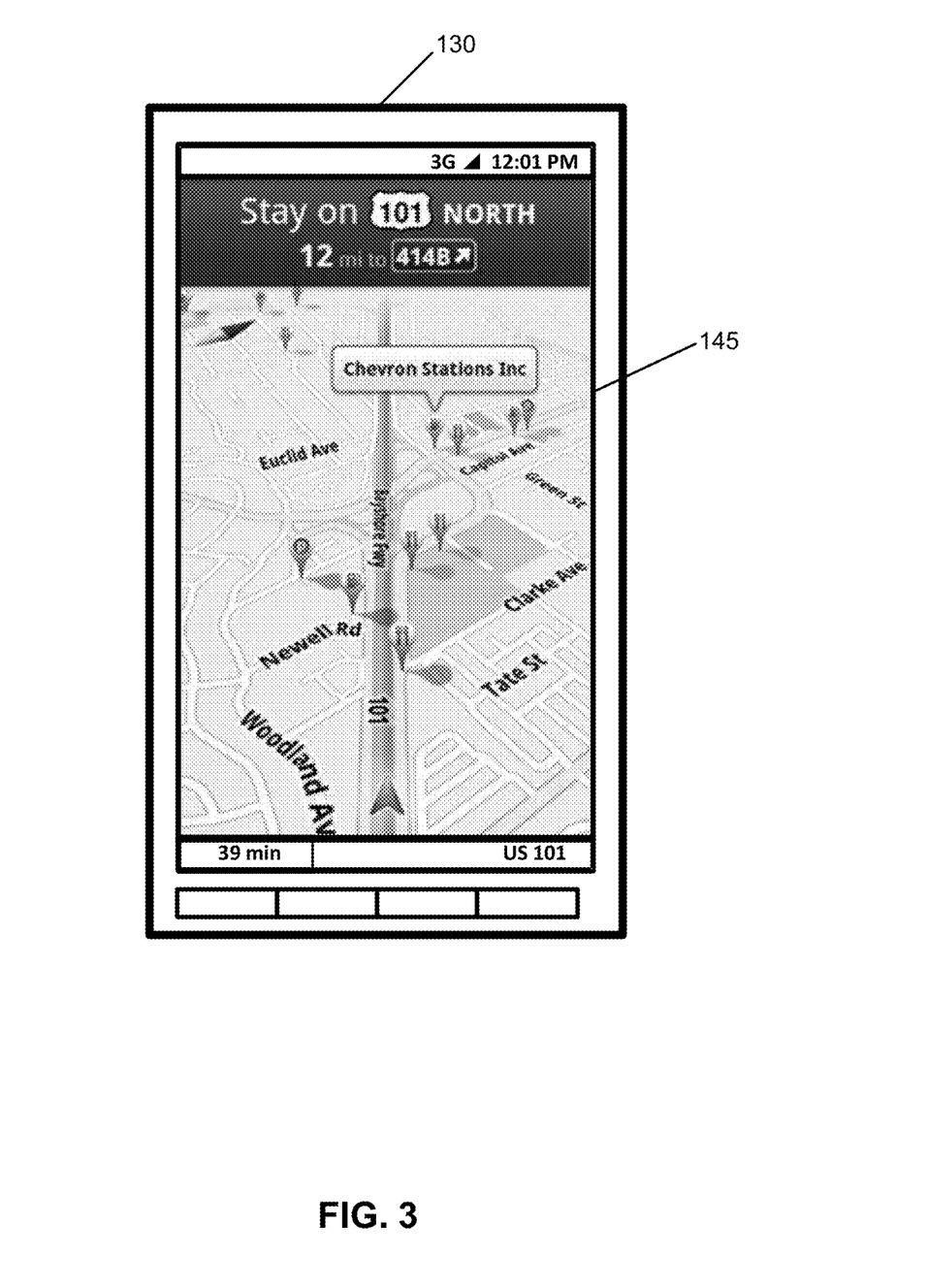
FIG. 3 illustrates a mobile device screen displaying a navigation application that may benefit from the present disclosure.

By way of further illustration, FIG. 3 depicts the mobile device 130 executing the navigation application 145 that provides a map display and turn-by-turn navigation directions. In some cases, the navigation application 145 downloads map data in response to a user request. The user request may be, for example, a command to display a specified geographic region on the mobile device or a command to continuously update the display with map data for the current location of which the mobile device 130 (which may be used when the user is driving). Although this approach generally reduces the amount of storage space on the mobile device 130 required for storing map data, this approach is dependent on a network connection to access downloadable map data. However, there may be situations in which the mobile device 130 does not have access to a data network to download the map data, or the mobile device 130 may encounter a data network with unfavorable data access characteristics. For example, there may be one or more geographic coverage areas in which a mobile device 130 has limited access to the network. In such situations, the mobile devices 130 may be temporarily unable to serve as a navigation device because of the missing map data.

To provide navigation in such "target" areas, the prefetching manager 119 may prefetch and cache map data before the user enters the target area. Thus, the user need not issue commands to cache map data before entering the target area. Otherwise, if the user fails to cache the map data, the user might be unable to download the map data when inside the target area. Moreover, even if the user were able to download map data from inside the target area, the user might incur higher charges when downloading the map data from inside the target area.

Figure 4:
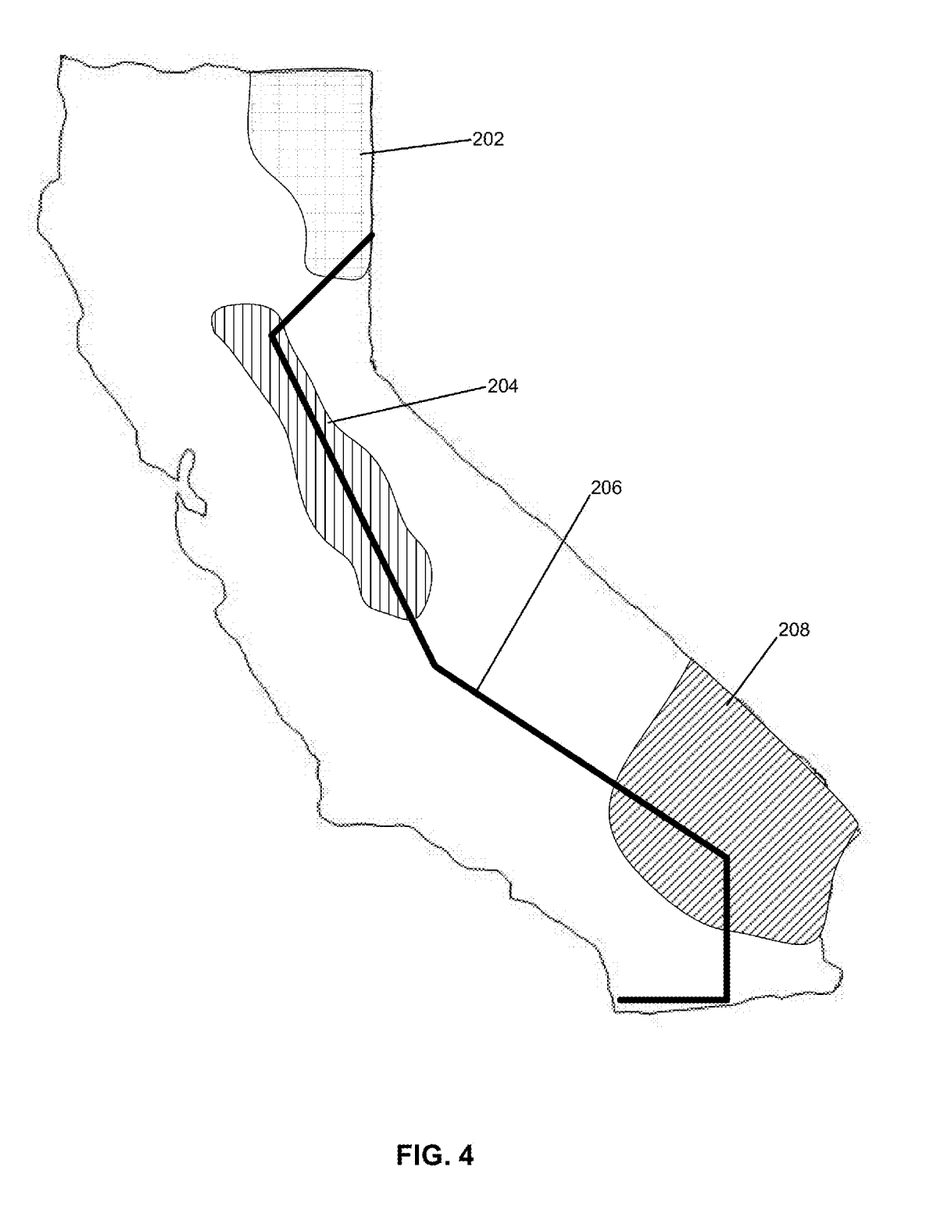
FIG. 4 illustrates a map with three mobile network service coverage areas through which the mobile device of FIG. 1 may travel.

To illustrate an example scenario in which the mobile device 130 prefetches map data in view of network coverage parameters, FIG. 4 illustrates a map of the state of California and an example path along which the mobile device 130 may travel between a first coverage area 202, a second coverage area 204, and a third coverage area 208. In this example, the coverage areas 202-208 define respective geographic regions for the purposes of prefetching map data. However, each of the coverage areas 202-208 in general may be divided into multiple geographic regions of any suitable size. For example, a geographic region may be a square region corresponding to a map "tile" at a certain zoom level. More generally, a geographic region for which map data may be prefetched may be defined in any suitable manner, and may include an entire coverage area or "footprint" of a wireless network or a portion of the coverage area. As the mobile device 130 travels from the first coverage area 202 to the third coverage area 208 along the travel path 206, the mobile device 130 may download map data related to the second coverage area 204 as the mobile device 130 enters or approaches the second coverage area 204. Similarly, the mobile device 130 may download map data related to the third coverage area 208 as the mobile device 130 enters of approaches the third coverage area 208.

In particular, the mobile device 130 may cache map data, while in the coverage area 202, upon determining that the mobile device 130 will likely transition from the first coverage area 202 having a first set of parameters to the second coverage area 204 having a second set of parameters, and determining that at least some of the relevant parameters of the first coverage area 202 are more favorable to downloading map data. As a more specific example, if the speed at which map data could be downloaded in the second coverage area 204 is significantly slower than the corresponding speed in the first coverage area 202, the map data could be cached while the mobile device 130 is in the first coverage area 202.

Referring back to FIG. 1, the parameters of the second coverage area 204 may be determined using the coverage areas database 122, which may be specific to one or more mobile network service providers. The parameters may indicate, for example, that accessing map data could be more expensive in the second coverage area 204 than in the first coverage area 202. In this case, map data could be downloaded while the mobile device 130 is in the first coverage area 202, in an effort to save costs. In both examples, the cached data probably would be accessed when the mobile device 130 arrives in the second coverage area 204.

In some cases, the prefetching manager 119 accesses the communications costs database 124 to determine an expected cost of operating the mobile device 130 on a mobile device network in a second coverage area 204. If the cost of operating the mobile device 130 in the second coverage area 204 exceeds a threshold established by a user or a system operator, for example, the prefetching manager 119 may cause map data to be cached while the mobile device 130 is in the first coverage area 202.

The prefetching manager 119 may access the communications data rates database 126 to determine an expected time or delay associated with downloading map data to the mobile device 130 when in a second coverage area 204, where the time or delay is related to the expected data access speed while in the second coverage area 204. If the time or delay in downloading the map data exceeds a threshold established by a user or a system operator, for example, the prefetching manager 119 might cause map data to be cached while the mobile device 130 is in the first coverage area 202. In an example, this threshold is based on user experience requirements. For example, a mobile device manufacturer or software developer may want to assure that a user's experience using the mobile device 130 as a personal navigation device is as close as possible to a standalone personal navigation device.

In an example implementation, the prefetching manager 119 determines that it is likely that the mobile device 130 will transition from the first coverage area 202 to the second coverage area 204 by using a user action as a signal. One example of such user action is sending a reference (e.g., a URL) to a certain map from a browser running on a personal computer to the smartphone. In response to this user-action related signal, the mobile device 130 automatically, without a command from the user, analyzes network parameters of at least the second coverage area 204 and caches map data related to the user action. If there are known areas of poor data network access (e.g., signal strength, data speed) along a route, the prefetching manager 119 may cause map data to be cached for those areas before the mobile device 130 enters the areas. Caching may occur at the time of the user action-generated signal, or it may occur when en route to a destination. In these cases, the user first opts-in and explicitly grants permission to the mobile device 130 and/or map data server 110 to automatically prefetch and cache map data.

Other user-related signals also may be used to initiate automatic prefetching and caching of map data. For example, the mobile device 130 may provide a user-selectable configuration option to enable or disable the sharing of search data with the prefetching manager 119. This option also may be a configuration of a service (e.g., electronic mail) to which the user subscribes. If the user, after selecting the option, searches for a business or some other point of interest, the prefetching manager 119 may automatically check whether the point of interest falls within an area with less favorable network coverage parameters and, in some cases, cache the relevant map data. In this scenario, a signal is generated based on the high likelihood that, after the user searches for a point of interest, her mobile device will enter the area in which the point of interest is located. In some situations, the signal may be generated at another computing device or from within a computing cloud.

In another example, the prefetching manager 119 may determine that the mobile device 130 is likely to cross a geographic or geopolitical border, for example a state or country border. In some situations, the second coverage area 204 may be across such a border relative to the first coverage area 202. In these situations, there may be legal or other restrictions related to accessing data on the mobile device, in addition to possible cost or network availability issues. Similar to the previous examples, the prefetching manager 119 may also determine whether there are any restrictions the mobile device 130 accessing a data network in a second coverage area 204, where, again, the second coverage area 204 is across a border. If there are such restrictions, the mobile device 130 or the map data server 110 may cause map data to be cached while the mobile device 130 is in a first coverage area.

With each of the previous examples of the present disclosure, it may be difficult to ascertain the exact geographic boundaries of coverage area, for example the first coverage area 202 and second coverage area 204. While there may be areas of known poor data network availability, the bounds of these areas may change due to changes in environmental conditions. Therefore, in another example of the present disclosure, a geographic buffer may be established by extending from the perimeter of one or more coverage areas. The geographic buffer provides a margin of error for maps of the boundaries of the coverage areas. The geographic buffer may be configured as one or more of a number of different geometric shapes, including, for example, circular areas or polygonal areas. Thus, a geographic region for which map data may be prefetched can correspond to a coverage area (or a portion of a coverage area) as well as additional buffer area, so that a mobile device sometimes can enter the geographic region prior to reaching the coverage area.

Figure 5:
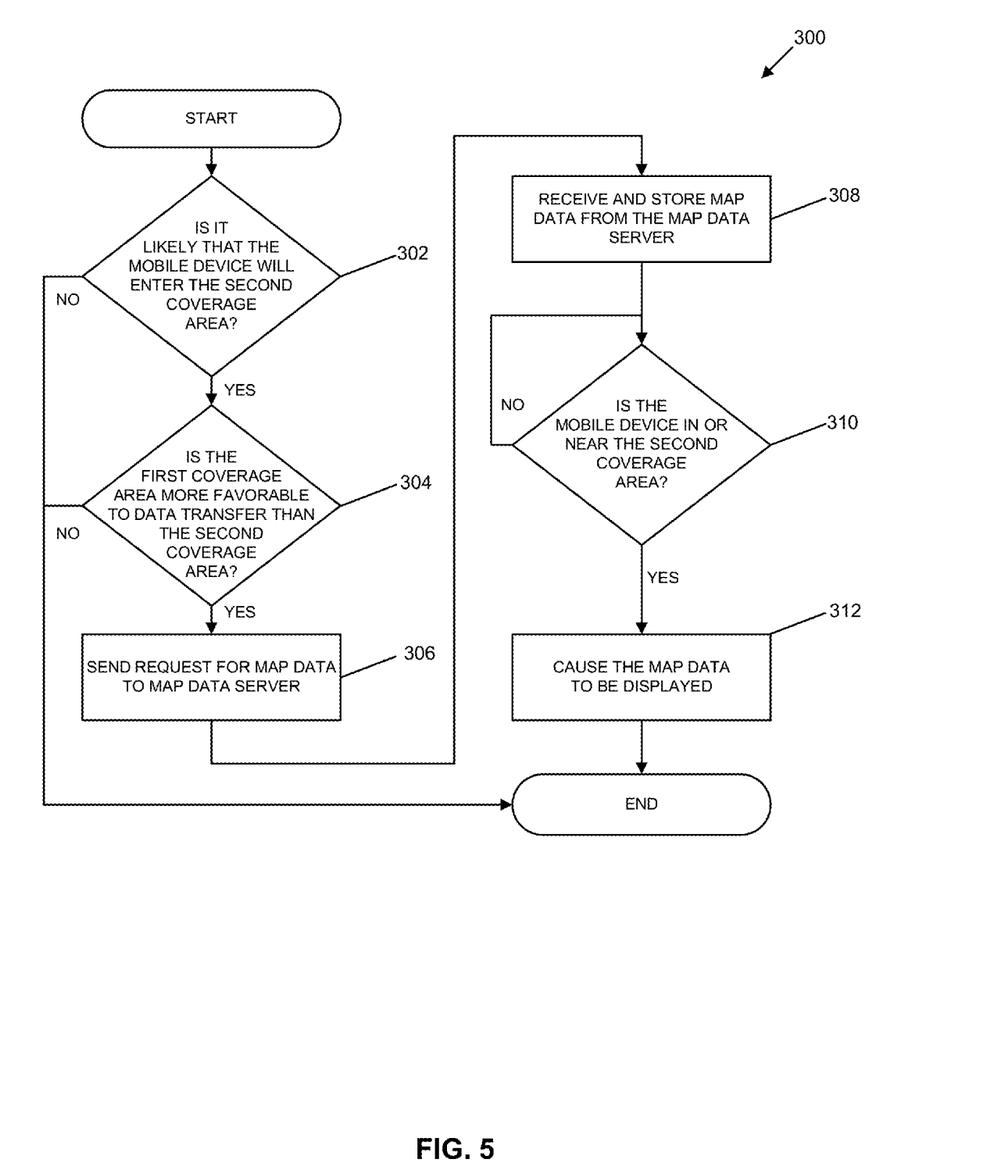
FIG. 5 illustrates a flow chart of an example method according to the present disclosure.

With reference to FIG. 5, a method 300 in the prefetching manager 119 (or another suitable device or system) may automatically determine, at a time when the mobile device 130 is positioned in a first coverage area, that the mobile device is likely to enter a second coverage area with characteristics or network service parameters different from the first coverage area (block 302). In response to determining that the mobile device is likely to enter the second coverage area, the method 300 determines that the first coverage area is more favorable to data transfer than the second coverage area using the first service parameters and the second service parameters (block 304). As discussed previously, this determination may be made based on factors such as data network access speed, data network access cost, and data network availability, for example.

Next, in response to determining that the first coverage area is more favorable to data transfer than the second coverage area, the method 300 may send to the map data server a request for map data for the second coverage area (block 306). For example, this request may be sent from within the first coverage area. As another example, this request may be sent from a third coverage area that is more favorable to data transfer than the second coverage area. More specifically, it may be determined that a certain intermediate coverage area through which the mobile device is expected to travel will be more favorable to transfer map data for the second coverage area than the second coverage area, even though the present location at which the mobile device is not suitable for prefetching map data (or less suitable than the intermediate coverage area). In other words, map data need not be prefetched immediately after it has been determined prefetching is suitable.

Upon receiving the requested map data from the map data server, the method 300 may cause the mobile device 130 to store the map data in a non-transitory computer-readable medium, making the map data available for later use by the mobile device (block 308). In an example, it may determined whether the mobile device is located in or near the second coverage area (block 310). In response to determining that the mobile device is in or near the second coverage are, the method 300 may cause the map data to be displayed (block 312). Alternatively, the map of the second coverage area can be rendered at block 312 in response to receiving the user request to view the map. In an example, causing the map data (or a portion of the map data) to be rendered when the mobile device is in or near the second coverage area is based on a quality level associated with the second coverage area being below a threshold. This quality level may be related to network access, data speed, or other factors associated with mobile network communications.

At least some of the techniques discussed above help reduce power usage of the mobile device 130. As the mobile device 130 attempts to establish a data connection in areas of reduced coverage, the mobile device 130 may use more power than it otherwise would use to cache map data in areas with more favorable service parameters. Furthermore, if a mobile device 130 takes a significantly longer period of time to download map data, the mobile device 130 may also use more power than it otherwise would use to cache map data in areas with more favorable service parameters. By caching map data before entering areas of reduced coverage, the mobile device 130 may make fewer attempts to access a data network or to use a slow network data connection.

Although the examples discussed above primarily discuss decisions to prefetch map data, it is noted that the prefetching manager 119 or a similar module also may assign priority to map data based on network coverage availability. Thus, in some situations, the prefetching manager 119 may prioritize the download of map data based on network parameters. As a more specific example, the prefetching manager 119 may determine that the mobile device 130 should cache map data for several regions, and schedule download of the map data for these regions in the descending order of quality of the corresponding parameters. In this manner, the region in which the download is most likely to take more time, require more power, be more expensive, etc. is scheduled for prefetching first.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain examples are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example examples, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one example" or "an example" means that a particular element, feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. For instance, some examples may be described using the term "coupled" to indicate that two or more elements are in direct physical or electrical contact. The term "coupled," however, may also mean that two or more elements are not in direct contact with each other, but yet still co-operate or interact with each other. The examples are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the examples herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs for systems and processes for prefetching and caching map data based on mobile network coverage through the principles disclosed herein. Thus, while particular examples and applications have been illustrated and described, it is to be understood that the disclosed examples are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for acquiring map data for rendering a map on a mobile device that includes a radio communications transceiver for transmitting and receiving data via a wireless network, the method comprising:
   automatically determining, at a time when the mobile device is positioned in a first coverage area, that the mobile device is likely to enter a second coverage area, wherein the wireless network is associated with first service parameters in the first coverage area and associated with second service parameters in the second coverage area, wherein the first service parameters and the second service parameters are indicative of one or both of (i) expected signal strength of the wireless network in the first coverage area and the second coverage area, respectively, and (ii) expected communications data rate of the wireless network in the first coverage area and the second coverage area, respectively, and wherein the mobile device has access to map data via the radio communications transceiver while in the first coverage area and the second coverage area;
   in response to determining that the mobile device is likely to enter the second coverage area, automatically determining that the first coverage area is more favorable to data transfer via the wireless network than the second coverage area using the first service parameters and the second service parameters;
   prioritizing map data downloads for a plurality of coverage areas using service parameters associated with the plurality of coverage areas, wherein the plurality of coverage areas includes the second coverage area, and wherein the service parameters associated with the plurality of coverage areas includes the second service parameters;
   based on the determination that the first coverage area is more favorable to data transfer via the wireless network than the second coverage area, sending, via the wireless network, a request for map data for rendering a map of the second coverage area, wherein the request is sent (i) at a time conforming to the prioritizing of the map data downloads, and (ii) prior to receiving a request to view the map of the second coverage area on the mobile device;
   receiving, at the mobile device and via the wireless network, the map data from a map data server;
   storing the map data in a non-transitory computer-readable medium; and
   in response to receiving the request to view the map of the second coverage area, rendering the map using the stored map data.

2. The method of claim 1, further comprising electronically accessing a database of a service provider that services the second coverage area to determine a boundary of the second coverage area and the second service parameters.

3. The method of claim 1, wherein determining that the first coverage area is more favorable to data transfer via the wireless network than the second coverage area includes comparing the expected signal strength of the wireless network in the first coverage area to the expected signal strength of the wireless network in the second coverage area.

4. The method of claim 1, wherein receiving the map data from the map data server further includes receiving map data for a geographic region that includes a buffer zone extending from the perimeter of the second coverage area.

5. A method for acquiring map data for rendering a map on a mobile device that includes a radio communications transceiver for transmitting and receiving data via a wireless network, the method comprising:
   determining that map data should be prefetched for each coverage area of a plurality of coverage areas;
   determining a plurality of sets of one or more service parameters, wherein, in each coverage area of the plurality of coverage areas, the wireless network is associated with a respective set of the plurality of sets of service parameters;
   prioritizing map data downloads for the plurality of coverage areas based on the plurality of sets of service parameters; and
   prefetching map data corresponding to the plurality of coverage areas in an order that is based on the prioritizing of the map data downloads, wherein prefetching map data corresponding to the plurality of coverage areas includes, for each coverage area of the plurality of coverage areas,
      sending, via the wireless network, a request for map data for rendering a map of the coverage area, wherein the request is sent prior to receiving a request to view the map of the coverage area on the mobile device,
      receiving, at the mobile device and via the wireless network, the map data from a map data server,
      storing the map data in a non-transitory computer-readable medium, and
      in response to receiving the request to view the map of the coverage area, rendering the map using the stored map data.

6. The method of claim 5, wherein prioritizing map data downloads for the plurality of coverage areas based on the plurality of sets of service parameters includes scheduling the map data downloads for the plurality of coverage areas in descending order of quality of the corresponding sets of service parameters.

7. The method of claim 6, wherein scheduling the map data downloads for the plurality of coverage areas in descending order of quality of the corresponding sets of service parameters includes prioritizing map data downloads that are likely to take more time over map data downloads that are likely to take less time.

8. The method of claim 6, wherein scheduling the map data downloads for the plurality of coverage areas in descending order of quality of the corresponding sets of service parameters includes prioritizing map data downloads that are likely to require more power over map data downloads that are likely to require less power.

9. The method of claim 6, wherein scheduling the map data downloads for the plurality of coverage areas in descending order of quality of the corresponding sets of service parameters includes prioritizing map data downloads that are likely to be more expensive over map data downloads that are likely to be less expensive.

10. The method of claim 5, wherein determining that map data should be prefetched for each coverage area of the plurality of coverage areas includes determining that the mobile device is likely to enter the plurality of coverage areas.

11. The method of claim 5, wherein the plurality of sets of one or more service parameters includes expected signal strengths of the wireless network in the corresponding coverage areas of the plurality of coverage areas.

12. The method of claim 5, wherein the plurality of sets of one or more service parameters includes expected communications data rates of the wireless network in the corresponding coverage areas of the plurality of coverage areas.

13. A mobile device comprising:
a processor;
a display in communication with the processor;
a radio communications transceiver in communication with the processor and configured transmit and receive data via a wireless network; and
a non-transitory computer-readable medium in communication with the processor, the computer-readable medium storing instructions thereon that are executable to cause the processor to
determine that map data should be prefetched for each coverage area of a plurality of coverage areas,
determine a plurality of sets of one or more service parameters, wherein, in each coverage area of the plurality of coverage areas, the wireless network is associated with a respective set of the plurality of sets of service parameters,
prioritize map data downloads for the plurality of coverage areas based on the plurality of sets of service parameters, and
prefetch map data corresponding to the plurality of coverage areas in an order that is based on the prioritizing of the map data downloads, at least in part by, for each coverage area of the plurality of coverage areas,
sending, via the wireless network, a request for map data for rendering a map of the coverage area, wherein the request is sent prior to receiving a request to view the map of the coverage area on the mobile device,
receiving, via the wireless network, the map data from a map data server,
storing the map data in the computer-readable medium, and
in response to receiving the request to view the map of the coverage area, rendering the map on the display using the stored map data.

14. The mobile device of claim 13, wherein the instructions are executable to cause the processor to prioritize the map data downloads for the plurality of coverage areas at least by scheduling the map data downloads for the plurality of coverage areas in descending order of quality of the corresponding sets of service parameters.

15. The mobile device of claim 14, wherein the instructions are executable to cause the processor to schedule the map data downloads for the plurality of coverage areas in descending order of quality of the corresponding sets of service parameters at least by prioritizing map data downloads that are likely to take more time over map data downloads that are likely to take less time.

16. The mobile device of claim 14, wherein the instructions are executable to cause the processor to schedule the map data downloads for the plurality of coverage areas in descending order of quality of the corresponding sets of service parameters at least by prioritizing map data downloads that are likely to require more power over map data downloads that are likely to require less power.

17. The mobile device of claim 14, wherein the instructions are executable to cause the processor to schedule the map data downloads for the plurality of coverage areas in descending order of quality of the corresponding sets of service parameters at least by prioritizing map data downloads that are likely to be more expensive over map data downloads that are likely to be less expensive.

18. The mobile device of claim 13, wherein the instructions are executable to cause the processor to determine that map data should be prefetched for each coverage area of the plurality of coverage areas at least by determining that the mobile device is likely to enter the plurality of coverage areas.

19. The mobile device of claim 13, wherein the plurality of sets of one or more service parameters includes expected signal strengths of the wireless network in the corresponding coverage areas of the plurality of coverage areas.

20. The mobile device of claim 13, wherein the plurality of sets of one or more service parameters includes expected communications data rates of the wireless network in the corresponding coverage areas of the plurality of coverage areas.

* * * * *